(12) United States Patent
Wang et al.

(10) Patent No.: US 10,904,867 B2
(45) Date of Patent: Jan. 26, 2021

(54) UPLINK CONTROL SIGNAL TRANSMISSION METHOD AND APPARATUS

(71) Applicant: Huawei Technologies Co., Ltd., Shenzhen (CN)

(72) Inventors: Da Wang, Shenzhen (CN); Jian Wang, Beijing (CN); Yun Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/347,137

(22) PCT Filed: Dec. 28, 2016

(86) PCT No.: PCT/CN2016/112639
§ 371 (c)(1),
(2) Date: May 2, 2019

(87) PCT Pub. No.: WO2018/082173
PCT Pub. Date: May 11, 2018

(65) Prior Publication Data
US 2019/0357201 A1 Nov. 21, 2019

(30) Foreign Application Priority Data
Nov. 3, 2016 (CN) .......................... 2016 1 0958406

(51) Int. Cl.
*H04W 72/04* (2009.01)
(52) U.S. Cl.
CPC ... *H04W 72/0413* (2013.01); *H04W 72/0446* (2013.01); *H04W 72/0453* (2013.01)

(58) Field of Classification Search
CPC ....... H04L 1/00; H04L 5/0053; H04L 5/0094; H04W 72/0413; H04W 72/0446; H04W 72/0453
(Continued)

(56) References Cited

U.S. PATENT DOCUMENTS 10,374,748 B2 * 8/2019 Oketani ................ H04L 1/0002
10,425,922 B2 * 9/2019 Islam ................... H04B 7/0695
(Continued)

FOREIGN PATENT DOCUMENTS

| CN | 102104467 A | 6/2011 |
|---|---|---|
| CN | 102255696 A | 11/2011 |

(Continued)

OTHER PUBLICATIONS

Machine Translation and Abstract of Chinese Publication No. CN102104467, Jun. 22, 2011, 15 pages.
(Continued)

*Primary Examiner* — Tan H Trinh
(74) *Attorney, Agent, or Firm* — Conley Rose, P.C.

(57) ABSTRACT

An uplink control signal transmission method and apparatus, where the method includes determining, by a first device, a first quantity of symbols, and sending, by the first device, an uplink control signal to a second device on at least one resource based on the first quantity of symbols, where a quantity of symbols included in the uplink control signal is a second quantity of symbols, and the second quantity of symbols is greater than or equal to the first quantity of symbols.

26 Claims, 7 Drawing Sheets

(58) Field of Classification Search
USPC .......... 455/69, 522; 370/210, 230, 329, 336, 370/344
See application file for complete search history.

(56) References Cited

U.S. PATENT DOCUMENTS

| | | | |
|---|---|---|---|
| 2010/0165931 A1* | 7/2010 | Nimbalker | H04L 5/0053 370/329 |
| 2011/0007627 A1* | 1/2011 | Lee | H04L 5/0048 370/210 |
| 2011/0013615 A1* | 1/2011 | Lee | H04B 7/0417 370/344 |
| 2011/0044312 A1* | 2/2011 | Lee | H04L 5/0053 370/344 |
| 2011/0268080 A1* | 11/2011 | Luo | H04L 5/0053 370/330 |
| 2011/0310853 A1 | 12/2011 | Yin et al. | |
| 2012/0026934 A1 | 2/2012 | Park et al. | |
| 2013/0028203 A1* | 1/2013 | Hooli | H04L 1/0026 370/329 |
| 2013/0272244 A1* | 10/2013 | Cheng | H04L 5/001 370/329 |
| 2013/0343446 A1* | 12/2013 | Eliaz | H04L 25/03821 375/230 |
| 2014/0293921 A1 | 10/2014 | Tang | |
| 2014/0369290 A1 | 12/2014 | Yang et al. | |
| 2014/0369324 A1* | 12/2014 | Lin | H04W 56/0005 370/336 |
| 2017/0041841 A1* | 2/2017 | Pedersen | H04W 36/08 |
| 2017/0041921 A1 | 2/2017 | Oketani | |
| 2017/0251463 A1* | 8/2017 | Kwak | H04L 5/0053 |
| 2018/0069653 A1* | 3/2018 | Fujishiro | H04W 16/14 |
| 2018/0206129 A1* | 7/2018 | Choi | H04L 5/0048 |
| 2019/0089569 A1* | 3/2019 | Tang | H04L 5/0044 |
| 2019/0090258 A1* | 3/2019 | Ryu | H04B 7/0632 |
| 2019/0090272 A1* | 3/2019 | Lee | H04W 72/0453 |
| 2019/0246411 A1* | 8/2019 | Kim | H04L 5/0091 |
| 2019/0261358 A1* | 8/2019 | Tang | H04L 5/0044 |
| 2019/0373603 A1* | 12/2019 | Choi | H04L 1/0026 |
| 2020/0037310 A1* | 1/2020 | Islam | H04B 7/0617 |

FOREIGN PATENT DOCUMENTS

| | | |
|---|---|---|
| CN | 102948191 A | 2/2013 |
| CN | 103167614 A | 6/2013 |
| CN | 103188033 A | 7/2013 |
| CN | 103188061 A | 7/2013 |
| KR | 20100097063 A | 9/2010 |
| WO | 2011158969 A1 | 12/2011 |
| WO | 2015107600 A1 | 7/2015 |

OTHER PUBLICATIONS

Foreign Communication From a Counterpart Application, PCT Application No. PCT/CN2016/112639, English Translation of International Search Report dated May 27, 2017, 2 pages.
Foreign Communication From a Counterpart Application, PCT Application No. PCT/CN2016/112639, English Translation of Written Opinion dated May 27, 2017, 6 pages.
R1-103770, Panasonic, "UCI multiplexing on PUSCH with MIMO transmission," 3GPP TSG RAN WG1 Meeting #61bis, Dresden, Germany, Jun. 28-Jul. 2, 2010, 4 pages.
R1-194216, Motorola, "UCI Multiplexing on PUSCH in UL-MIMO Transmissions," 3GPP TSG RAN1#61b, Dresden, Germany, Jun. 28-Jul. 2, 2010, 13 pages.
3GPP TS 36.212 V8.8.0, "3rd Generation Partnership Project; Technical Specification Group Radio Access Network; Evolved Universal Terrestrial Radio Access (E-UTRA); Multiplexing and channel coding (Release 8)," Dec. 2009, 60 pages.

\* cited by examiner

UPLINK CONTROL SIGNAL TRANSMISSION METHOD AND APPARATUS

CROSS-REFERENCE TO RELATED APPLICATIONS

This application is a U.S. National Stage of International Patent Application No. PCT/CN2016/112639 filed on Dec. 28, 2016, which claims priority to Chinese Patent Application No. 201610958406.X filed on Nov. 3, 2016. Both of the aforementioned applications are hereby incorporated by reference in their entireties.

TECHNICAL FIELD

This application relates to the communications field, and more specifically, to an uplink control signal transmission method and apparatus.

BACKGROUND

To improve accuracy and reliability of wireless communication, a second device and a first device transmit an uplink control signal (or an uplink control channel) in a communication process.

In addition, in the prior art, a quantity of symbols in each uplink transmission subframe that are used to carry an uplink control signal is fixed and is 14, and each uplink control signal is transmitted on only one resource.

However, with development of communications technologies, a quantity of symbols included in each resource changes, and not every resource includes 14 symbols for an uplink control channel. In addition, requirements, of a communications service, on a quantity of symbols occupied by an uplink control signal and on transmission power are also diversified. For example, a terminal device may send an uplink control signal by occupying a quantity of symbols that is greater than, equal to, or less than 14. Consequently, it is possible that a quantity of symbols included in a resource cannot satisfy a transmission power requirement of an uplink control signal. In this case, if a prior-art transmission method in which a fixed quantity of symbols in a resource are used to carry an uplink control signal is used, a terminal device transmits the uplink control signal when a quantity of symbols included in a resource can satisfy the transmission power requirement. This causes a waste of resources, and increases a transmission delay of the uplink control signal.

SUMMARY

This application provides an uplink control signal transmission method and apparatus, so as to reduce a waste of communications resources and reduce a transmission delay of an uplink control signal.

According to a first aspect, an uplink control signal transmission method is provided, where the method includes: determining, by a first device, a first quantity of symbols; and sending, by the first device, an uplink control signal on at least one resource based on the first quantity of symbols, where a quantity of symbols included in the uplink control signal is a second quantity of symbols, and the second quantity of symbols is greater than or equal to the first quantity of symbols.

The uplink control signal is sent on the at least one resource. When a quantity of symbols included in a resource is less than the first quantity of symbols, the uplink control signal may be sent by occupying a plurality of resources including the resource. This can reduce a delay of uplink control signal transmission between the first device and a second device and can reduce resource overheads.

The uplink control signal is sent by using symbols whose quantity is greater than the first quantity of symbols, to improve resource scheduling flexibility during uplink control signal transmission.

With reference to the first aspect, in a first implementation of the first aspect, the determining, by a first device, a first quantity of symbols includes: determining, by the first device, a first measurement result based on a first reference signal sent by a second device; and determining, by the first device, the first quantity of symbols based on the first measurement result.

The first device determines the first quantity of symbols by using the first reference signal sent by the second device, where the first reference signal reflects channel quality of a channel between the first device and the second device. Therefore, the first quantity of symbols that is determined by using the first reference signal is associated with the quality of the channel between the first device and the second device. This can improve reliability of uplink control signal transmission between the second device and the first device.

With reference to the first aspect and the foregoing implementation of the first aspect, the method further includes: receiving, by the first device, first information sent by the second device, where the first information is used to indicate a mapping relationship between the first measurement result and the first quantity of symbols; and the determining, by the first device, the first quantity of symbols based on the first measurement result includes: determining, by the first device, the first quantity of symbols based on the mapping relationship and the first measurement result.

With reference to the first aspect and the foregoing implementations of the first aspect, in a third implementation of the first aspect, before the sending the uplink control signal, the method further includes: sending, by the first device, second information to the second device, where the second information is used to indicate the second quantity of symbols.

The second information used to indicate the quantity of symbols included in the uplink control signal is sent to the second device, so that the second device receives, more purposefully, the uplink control signal sent by the first device. This improves accuracy and reliability of receiving the uplink control signal by the second device.

With reference to the first aspect and the foregoing implementations of the first aspect, in a fourth implementation of the first aspect, the determining, by a first device, a first quantity of symbols includes: receiving, by the first device, third information sent by the second device, where the third information is used to indicate the first quantity of symbols; and determining, by the first device, the first quantity of symbols based on the third information.

The first quantity of symbols that is determined by the second device based on a second reference signal is sent to the first device, where the first quantity of symbols is associated with channel quality of a channel between the first device and the second device. This can improve reliability of uplink control signal transmission between the second device and the first device, thereby ensuring a transmission range of the uplink control signal.

With reference to any one of the first aspect or the foregoing implementations of the first aspect, in a fifth implementation of the first aspect, the sending an uplink control signal by occupying at least one resource includes:

determining, by the first device, a first time domain resource, and sending the uplink control signal in some or all of uplink transmission symbols that are located in the first time domain resource and after the first time domain resource.

The first device determines the first time domain resource for sending the uplink control channel, and sends the uplink control signal in some or all of the uplink transmission symbols that are located in the first time domain resource and after the first time domain resource, so that the second device receives, more purposefully, the uplink control signal sent by the first device. This improves accuracy and reliability of receiving the uplink control signal by the second device.

With reference to the first aspect and the foregoing implementations of the first aspect, in a sixth implementation of the first aspect, the sending an uplink control signal by occupying at least one resource includes: sending, by the first device, the uplink control signal on at least one of time domain resources that are at the first time domain resource and after the first time domain resource.

With reference to the first aspect and the foregoing implementations of the first aspect, in a seventh implementation of the first aspect, the determining, by the first device, a first time domain resource includes: receiving, by the first device, fourth information sent by the second device, where the fourth information is used to indicate the first time domain resource.

The second device indicates, to the first device, the first time domain resource for sending the uplink control signal, so that a time-frequency domain resource occupied when the first device sends the uplink control signal is more flexible.

With reference to any one of the first aspect or the foregoing implementations of the first aspect, in an eighth implementation of the first aspect, the sending an uplink control signal by occupying at least one resource includes: determining, by the first device, M time domain resources, where M≥1; and sending, by the first device, the uplink control signal in some or all of uplink transmission symbols in the M time domain resources.

The first device determines the M time domain resources, and sends the uplink control signal on the M time domain resources, so that the second device receives, more purposefully, the uplink control signal sent by the first device. This improves accuracy and reliability of receiving the uplink control signal by the second device.

With reference to the first aspect and the foregoing implementations of the first aspect, in a ninth implementation of the first aspect, the sending, by the first device, the uplink control signal on the M time domain resources includes: when M is greater than 1, sending, by the first device, the uplink control signal on at least one of the M time domain resources.

With reference to the first aspect and the foregoing implementations of the first aspect, in a tenth implementation of the first aspect, the determining, by the first device, M time domain resources includes: receiving, by the first device, fifth information sent by the second device, where the fifth information is used to indicate at least one of the M time domain resources.

With reference to any one of the first aspect or the foregoing implementations of the first aspect, in an eleventh implementation of the first aspect, the method further includes: determining, by the first device, a first resource; and the sending an uplink control signal by occupying at least one resource includes: sending, by the first device, the uplink control signal on the first resource, where the first resource includes a time domain resource and/or a frequency domain resource.

With reference to any one of the first aspect or the foregoing implementations of the first aspect, in a twelfth implementation of the first aspect, the first quantity of symbols is associated with channel quality of a channel between the second device and the first device.

Making the first quantity of symbols associated with the channel quality of the channel between the first device and the second device can ensure that power, of the uplink control signal, determined based on the quantity of symbols used to carry the uplink control signal satisfies a current channel state. In this way, reliability of uplink control signal transmission between the second device and the first device can be improved on a basis of flexibility determining the quantity of symbols used to transmit the uplink control signal. Further, a waste of communications resources can be avoided, and communication reliability and accuracy can be improved.

According to a second aspect, an uplink control signal transmission method is provided, where the method includes: receiving, by a second device on at least one resource, an uplink control signal that is sent by a first device based on a first quantity of symbols, where a quantity of symbols included in the uplink control signal is a second quantity of symbols, and the second quantity of symbols is greater than or equal to the first quantity of symbols.

The uplink control signal is sent on the at least one resource. When a quantity of symbols included in a resource is less than the first quantity of symbols, the uplink control signal may be sent by occupying a plurality of resources including the resource. This can reduce a delay of uplink control signal transmission between the first device and the second device and can reduce signaling overheads, while satisfying a transmission range.

The uplink control signal is sent by using symbols whose quantity is greater than the first quantity of symbols. This can improve resource scheduling flexibility during uplink control signal transmission, while satisfying the transmission range.

With reference to the second aspect, in a first implementation of the second aspect, before the receiving the uplink control signal, the method further includes: sending, by the second device, a first reference signal to the first device, so that the first device determines a first measurement result based on the first reference signal, and determines the first quantity of symbols based on the first measurement result.

The first device determines the first quantity of symbols by using the first reference signal sent by the second device, where the first reference signal reflects channel quality of a channel between the first device and the second device. Therefore, the first quantity of symbols that is determined by using the first reference signal is associated with the quality of the channel between the first device and the second device. This can improve reliability of uplink control signal transmission between the second device and the first device.

With reference to the second aspect and the foregoing implementation of the second aspect, in a second implementation of the second aspect, the method further includes: sending, by the second device, first information to the first device, where the first information is used to indicate a mapping relationship between the first measurement result and the first quantity of symbols.

With reference to the second aspect and the foregoing implementations of the second aspect, in a third implementation of the second aspect, before the receiving the uplink control signal, the method further includes: receiving, by the second device, second information sent by the first device, where the second information is used to indicate the second quantity of symbols; and the receiving, by the second device, the uplink control signal includes: receiving, by the second device, the uplink control signal based on the second information.

The second information that is used to indicate the quantity of symbols included in the uplink control signal and that is sent by the first device is received, so that the second device receives, more purposefully, the uplink control signal sent by the first device. This improves accuracy and reliability of receiving the uplink control signal by the second device.

With reference to the second aspect and the foregoing implementations of the second aspect, in a fourth implementation of the second aspect, before the receiving the uplink control signal, the method further includes: sending, by the second device, third information to the first device, where the third information is used to indicate the first quantity of symbols.

The first quantity of symbols that is determined by the second device based on a second reference signal is sent to the first device, where the first quantity of symbols is associated with channel quality of a channel between the first device and the second device. This can improve reliability of uplink control signal transmission between the second device and the first device, thereby ensuring a transmission range of the uplink control signal.

With reference to any one of the second aspect or the foregoing implementations of the second aspect, in a fifth implementation of the second aspect, the receiving an uplink control signal on at least one resource includes: determining, by the second device, a first time domain resource, and receiving the uplink control signal in some or all of uplink transmission symbols that are located in the first time domain resource and after the first time domain resource.

The first device determines the first time domain resource for sending the uplink control channel, and receives the uplink control signal in some or all of the uplink transmission symbols that are located in the first time domain resource and after the first time domain resource, so that the second device receives, more purposefully, the uplink control signal sent by the first device. This improves accuracy and reliability of receiving the uplink control signal by the second device.

With reference to the second aspect and the foregoing implementations of the second aspect, in a sixth implementation of the second aspect, the receiving an uplink control signal on at least one resource includes:

receiving, by the second device, the uplink control signal on at least one of time domain resources that are at the first time domain resource and after the first time domain resource.

With reference to the second aspect and the foregoing implementations of the second aspect, in a seventh implementation of the second aspect, before the receiving the uplink control signal, the method further includes: sending, by the second device, fourth information to the first device, where the fourth information is used to indicate the first time domain resource.

The second device indicates, to the first device, the first time domain resource for sending the uplink control signal, so that a time-frequency domain resource occupied when the first device sends the uplink control signal is more flexible.

With reference to any one of the second aspect or the foregoing implementations of the second aspect, in an eighth implementation of the second aspect, the receiving an uplink control signal on at least one resource includes: determining, by the second device, M time domain resources, where M≥1; and receiving, by the second device, the uplink control signal in some or all of uplink transmission symbols in the M time domain resources.

The first device determines the M time domain resources, and receives the uplink control signal in some or all of the uplink transmission symbols in the M time domain resources, so that the second device receives, more purposefully, the uplink control signal sent by the first device. This improves accuracy and reliability of receiving the uplink control signal by the second device.

With reference to the second aspect and the foregoing implementations of the second aspect, in a ninth implementation of the second aspect, the receiving, by the second device, the uplink control signal on the M time domain resources includes: when M is greater than 1, receiving, by the second device, the uplink control signal on at least one of the M time domain resources.

With reference to the second aspect and the foregoing implementations of the second aspect, in a tenth implementation of the second aspect, before the receiving the uplink control signal, the method further includes: sending, by the second device, fifth information to the second device, where the fifth information is used to indicate at least one of the M time domain resources.

With reference to any one of the second aspect or the foregoing implementations of the second aspect, in an eleventh implementation of the second aspect, the method further includes: determining, by the second device, a first resource; and the receiving an uplink control signal on at least one resource includes: receiving, by the second device, the uplink control signal on the first resource, where the first resource includes a time domain resource and/or a frequency domain resource.

With reference to any one of the second aspect or the foregoing implementations of the second aspect, in a twelfth implementation of the second aspect, the first quantity of symbols is associated with channel quality of a channel between the second device and the first device.

Making the first quantity of symbols associated with the channel quality of the channel between the first device and the second device can ensure that power, of the uplink control signal, determined based on the quantity of symbols used to carry the uplink control signal satisfies a current channel state. In this way, reliability of uplink control signal transmission between the second device and the first device can be improved on a basis of flexibility determining the quantity of symbols used to transmit the uplink control signal. Further, a waste of communications resources can be avoided, and communication reliability and accuracy can be improved.

According to a third aspect, an uplink control signal transmission apparatus is provided, including units configured to perform steps of the uplink control signal transmission method according to any one of the first aspect or the implementations of the first aspect.

According to a fourth aspect, an uplink control signal transmission apparatus is provided, including units configured to perform steps of the uplink control signal transmission method according to any one of the second aspect or the implementations of the second aspect.

According to a fifth aspect, an uplink control signal transmission device is provided, including a memory and a processor. The memory is configured to store a computer program. The processor is configured to invoke the computer program from the memory and run the computer program, so that the first device performs the uplink control signal transmission method according to any one of the first aspect or the implementations of the first aspect.

According to a sixth aspect, an uplink control signal transmission device is provided, including a memory and a processor. The memory is configured to store a computer program. The processor is configured to invoke the computer program from the memory and run the computer program, so that the second device performs the uplink control signal transmission method according to any one of the second aspect or the implementations of the second aspect.

According to a seventh aspect, a computer program product is provided. The computer program product includes computer program code. When a processing unit and a sending unit or a processor and a transmitter of a second device run the computer program code, a first device is caused to perform the uplink control signal transmission method according to any one of the first aspect or the implementations of the first aspect.

According to an eighth aspect, a computer program product is provided. The computer program product includes computer program code. When a receiving unit and a processing unit or a receiver and a processor of a first device run the computer program code, a second device is caused to perform the uplink control signal transmission method according to any one of the second aspect or the implementations of the second aspect.

According to a ninth aspect, a computer readable storage medium is provided. The computer readable storage medium stores a program, and the program enables a first device to perform the uplink control signal transmission method according to any one of the first aspect or the implementations of the first aspect.

According to a tenth aspect, a computer readable storage medium is provided. The computer readable storage medium stores a program, and the program enables a second device to perform the uplink control signal transmission method according to any one of the second aspect or the implementations of the second aspect.

DESCRIPTION OF EMBODIMENTS

Figure 1:
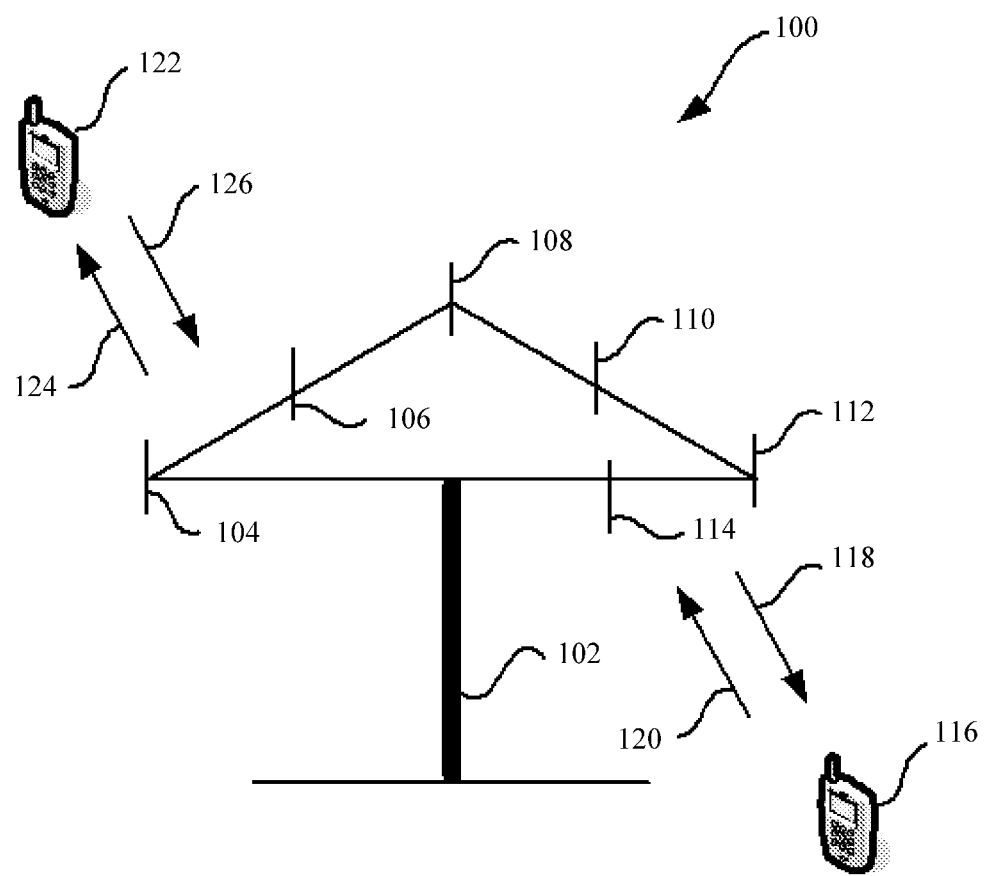
FIG. 1 is a schematic architectural diagram of a communications system according to this application.

The following clearly and completely describes the technical solutions in this application with reference to the accompanying drawings in this application.

Terms such as "component", "module", and "system" used in this specification are used to represent computer-related entities, hardware, firmware, combinations of hardware and software, software, or software being executed. For example, a component may include but is not limited to a process that runs on a processor, a processor, an object, an executable file, a thread of execution, a program, and/or a computer. As shown in figures, both an application that runs on a computing device and a computing device may be components. One or more components may reside in a process and/or a thread of execution, and a component may be located on one computer and/or distributed between two or more computers. In addition, these components may be executed from various computer readable media that store various data structures. The components may communicate, for example, by using a local process and/or a remote process and based on a signal having one or more data packets (for example, data from two components interacting with another component in a local system, a distributed system, and/or a network, such as the Internet interacting with another system by using a signal).

It should be understood that the technical solutions in this application may be applied to various communications systems, for example, a Global System for Mobile Communications (Global System of Mobile communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, a Long Term Evolution Advanced (Advanced long term evolution, "LTE-A" for short) system, a Universal Mobile Telecommunications System (Universal Mobile Telecommunication System, "UMTS" for short), a 5G new air interface communications system (5G New Radio, "NR" for short), or a next-generation communications system.

A next-generation mobile communications system not only supports conventional communication, but also supports, for example, machine-to-machine (Machine to Machine, "M2M" for short) communication or vehicle to vehicle (Vehicle to Vehicle, "V2V" for short) communication. The M2M communication may also be referred to as machine type communication (Machine Type Communication, "MTC" for short).

This application describes embodiments with reference to a first device. The first device may also be referred to as user equipment (User Equipment, "UE" for short) user equipment, an access terminal, a subscriber unit, a subscriber station, a mobile station, a mobile console, a remote station, a remote terminal, a mobile device, a user terminal, a terminal, a wireless communications device, a user agent, or a user apparatus. The first device may be a station (Station, "ST" for short) in a wireless local area network (Wireless Local Area Networks, "WLAN" for short), or may be a cellular phone, a cordless phone, a Session Initiation Protocol (Session Initiation Protocol, "SIP" for short) phone, a wireless local loop (Wireless Local Loop, "WLL" for short) station, a personal digital processing (Personal Digital Assistant, "PDA" for short) device, a handheld device with a wireless communication function, a computing device, another processing device connected to a wireless modem, an in-vehicle device, a wearable device, a first device in a next-generation communications system, such as a 5th Generation (fifth-generation, "5G" for short) network, a first device in a future evolved public land mobile network (Public Land Mobile Network, "PLMN" for short) network, or the like.

In addition, this application describes the embodiments with reference to a second device. The second device may be a device, such as the second device, configured to communicate with a mobile device. The second device may be an access point (ACCESS POINT, "AP" for short) in a WLAN, a base transceiver station (Base Transceiver Station, "BTS" for short) in GSM or CDMA, a NodeB (NodeB, "NB" for short) in WCDMA, an evolved NodeB (Evolutional NodeB, "eNB" or "eNodeB" for short) in LTE, a relay station, an access point, an in-vehicle device, a wearable device, a second device in a future 5G network, a second device in a future evolved PLMN network, or the like.

A method and an apparatus that are provided in this application may be applied to the first device or the second device. The first device or the second device includes a hardware layer, an operating system layer that runs above the hardware layer, and an application layer that runs above the operating system layer. The hardware layer includes hardware such as a central processing unit (Central Processing Unit, "CPU" for short), a memory management unit (Memory Management Unit, "MMU" for short), and a memory (also referred to as a main memory). The operating system may be any one or more computer operating systems implementing service processing by using a process (Process), for example, a Linux operating system, a Unix operating system, an Android operating system, an iOS operating system, or a Windows operating system. The application layer includes applications such as a browser, a contact list, word processing software, and instant messaging software. In addition, in this application, a specific structure of an execution body of a signal transmission method is not particularly limited in this application, provided that communication can be performed according to the signal transmission method in this application by running a program that records code of the signal transmission method in this application. For example, an execution body of a feedback information transmission method in this application may be the first device or the second device, or may be a function module that is in the first device or the second device and that can invoke and execute the program.

In addition, aspects or features of this application may be implemented as a method, an apparatus, or a product that uses standard programming and/or engineering technologies. The term "product" used in this application covers a computer program that can be accessed from any computer readable device, carrier, or medium. For example, the computer readable medium may include but is not limited to: a magnetic storage device (for example, a hard disk, a floppy disk, or a magnetic tape), an optical disc (for example, a compact disc (Compact Disc, "CD" for short) or a digital versatile disc (Digital Versatile Disc, "DVD" for short)), a smart card, and a flash memory device (for example, an erasable programmable read-only memory (Erasable Programmable Read-Only Memory, "EPROM" for short), a card, a stick, or a key drive). In addition, various storage media described in this specification may represent one or more devices and/or other machine-readable media configured to store information. The term "machine-readable media" may include but is not limited to a radio channel, and various other media that can store, contain, and/or carry an instruction and/or data.

FIG. 1 is a schematic diagram of a communications system to which an uplink control signal transmission method and apparatus in this application are applicable. As shown in FIG. 1, the communications system 100 includes a second device 102. The second device 102 may include a plurality of antennas, for example, an antenna 104, an antenna 106, an antenna 108, an antenna 110, an antenna 112, and an antenna 114. In addition, the second device 102 may additionally include a transmitter link and a receiver link. A person of ordinary skill in the art can understand that both the transmitter link and the receiver link may include a plurality of parts related to signal sending and receiving (for example, a processor, a modulator, a multiplexer, a demodulator, a demultiplexer, or an antenna).

The second device 102 may communicate with a plurality of first devices (for example, a first device 116 and a first device 122). However, it can be understood that the second device 102 may communicate with any quantity of first devices similar to the first device 116 or the first device 122. The first device 116 and the first device 122 may be, for example, cellular phones, smartphones, portable computers, handheld communications devices, handheld computing devices, satellite radio apparatuses, global positioning systems, PDAs, and/or any other proper devices used for communication in the wireless communications system 100.

As shown in FIG. 1, the first device 116 communicates with the second device 102. In this case, the antenna 112 and the antenna 114 send information to the first device 116 over a forward link 118, and receive information from the first device 116 over a reverse link 120. In addition, the first device 122 communicates with the second device 102. In this case, the antenna 104 and the antenna 106 send information to the first device 122 over a forward link 124, and receive information from the first device 122 over a reverse link 126.

For example, in a frequency division duplex (Frequency Division Duplex, "FDD" for short) system, for example, frequency bands used by the forward link 118 and the reverse link 120 are different, and frequency bands used by the forward link 124 and the reverse link 126 are different.

For another example, in a time division duplex (Time Division Duplex, "TDD" for short) system and a full duplex (Full Duplex) system, frequency bands used by the forward link 118 and the reverse link 120 may be the same, and frequency bands used by the forward link 124 and the reverse link 126 may be the same.

Each antenna (or antenna group including a plurality of antennas) and/or area designed for communication are/is referred to as a sector of the second device 102. For example, the antenna group may be designed to communicate with the first device in the sector of a coverage area of the second device 102. In a process in which the second device 102 communicates with the first device 116 and the first device 122 by using the forward link 118 and the forward link 124, respectively, a transmit antenna of the second device 102 may increase signal-to-noise ratios of the forward link 118 and the forward link 124 through beamforming. In addition, compared with a manner in which the second device sends, by using a single antenna, a signal to all first devices corresponding to the second device, interference to a mobile device in a neighboring cell is relatively small when the second device 102 sends, through beamforming, a signal to the first device 116 and the first device 122 that are randomly distributed in a related coverage area.

At a specified time, the second device 102, the first device 116, or the first device 122 may be a wireless communication sending apparatus and/or a wireless communication receiving apparatus. When sending data, the wireless communication sending apparatus may encode the data for transmission. Specifically, the wireless communication sending apparatus may obtain a specific quantity of data bits that are to be sent to the wireless communication receiving apparatus through a channel (for example, the specific quantity of data bits are generated, are received from another communications apparatus, or are stored in a memory). Such data bits may be included in a transport block (or a plurality of transport blocks) of the data, and the transport block may be segmented to generate a plurality of code blocks.

In addition, the communications system 100 may be a PLMN network, a D2D network, an M2M network, or another network. FIG. 1 is merely a simplified schematic diagram used as an example. The network may further include another second device, which is not shown in FIG. 1.

It should be noted that, in this application, the sending device may be the second device 102 or may be the first device (for example, the first device 116 or the first device 122). Correspondingly, a receiving device may be the first device (for example, the first device 116 or the first device 122) or may be the second device 102. This is not particularly limited in this application.

In an existing Long Term Evolution (Long Term Evolution, "LTE" for short) system, an uplink control channel occupies, in frequency domain, two ends of a frequency band corresponding to an uplink timeslot, and occupies, at each of the two ends, some of frequency domain resources of a physical resource block (Physical Resource Block, "PRB" for short); and occupies 14 symbols in time domain, where duration of each symbol is 1 ms. It can be learned that a time domain resource and a frequency domain resource that are occupied by the uplink control channel are both fixed. However, in future 5th Generation mobile communications (5th-Generation, "5G" for short), not every timeslot or subframe includes 14 symbols for an uplink control channel, and due to a change of a subcarrier spacing, not every timeslot or subframe has duration of 1 ms. Therefore, in a timeslot including fewer than 14 symbols, when duration of the corresponding timeslot is less than 1 ms, a transmission range of uplink control signal transmission by user equipment (User Equipment, "UE" for short) cannot be ensured.

Figure 2:
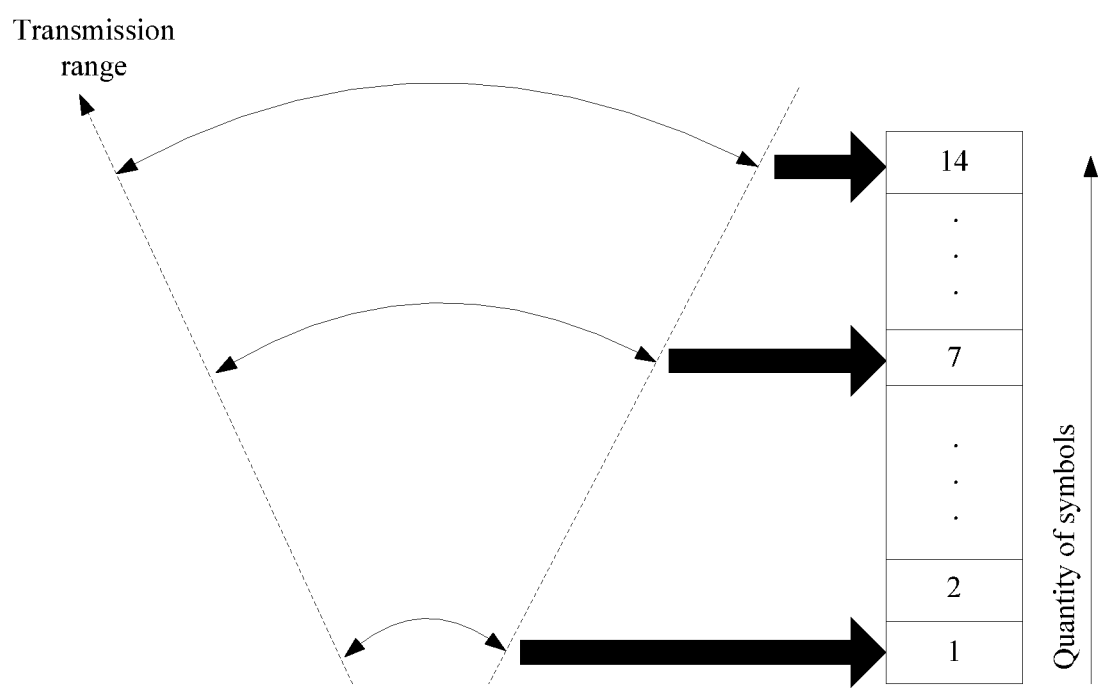
FIG. 2 is a schematic diagram of a relationship between a transmission range of an uplink control signal and a quantity of symbols included according to this application.

During uplink control signal transmission, a relationship between a quantity of symbols included in an uplink control signal and a transmission range of the uplink control signal is shown in FIG. 2. It can be learned that, when the quantity of symbols included in the uplink control signal increases, the transmission range of the uplink control signal also increases.

Figure 3:
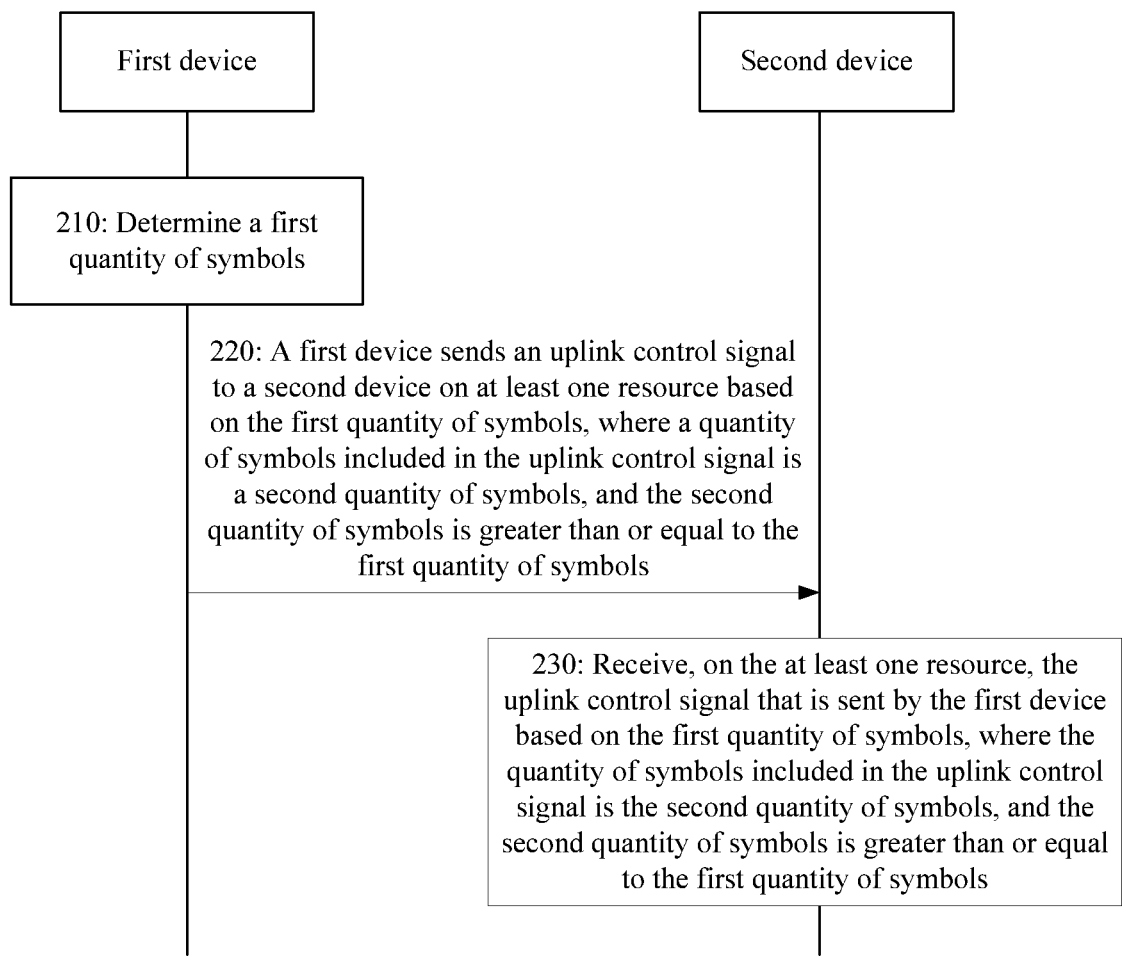
FIG. 3 is a schematic flowchart of an uplink control signal transmission method according to this application.

FIG. 3 is a schematic flowchart of an uplink control signal transmission method according to an embodiment of this application. A first device in FIG. 3 may be the first device 116 and the first device 122 in FIG. 1, and a second device in FIG. 3 may be the second device 102 in FIG. 1. Certainly, in an actual system, a quantity of second devices and a quantity of first devices may not be limited to an example in this embodiment or another embodiment, and this is not repeated in the following.

210: The first device determines a first quantity of symbols.

Optionally, the first device determines a first measurement result based on a first reference signal sent by the second device, and determines the first quantity of symbols based on the first measurement result.

Optionally, the first quantity of symbols is associated with channel quality of a channel between the terminal device and the network device.

Specifically, in this application, the first device receives the first reference signal sent by the second device. The first reference signal may be at least one of a cell-specific reference signal (Cell-specific Reference Signals, "CRS" for short), a UE-specific reference signal (UE-specific Reference Signals, "URS" for short), a demodulation reference signal (Demodulation Reference Signals, "DRS" for short), an MBSFN reference signal (Multimedia Broadcast multicast service Single Frequency Network Reference Signals, "MBSFN-RS" for short), a positioning reference signal (Positioning Reference Signals, "PRS" for short), and a CSI reference signal (CSI Reference Signals, "CSI-RS" for short). The first device measures the first reference signal, to obtain the first measurement result of the first reference signal. The first measurement result is associated with channel quality of a channel between the first device and the second device. The first measurement result may be at least one of receive power (Reference Signal Receiving Power, "RSRP" for short), receive quality (Reference Signal Receiving Quality, "RSRQ" for short), or receive strength (Received Signal Strength Indicator, "RSSI" for short). The first device determines, based on the first measurement result, a channel quality status, of the channel between the first device and the second device, corresponding to the first measurement result, and determines the corresponding first quantity of symbols based on the channel quality status of the channel between the first device and the second device. In this way, when the first device transmits an uplink control signal by using the first quantity of symbols, the second device can normally receive the uplink control signal. This satisfies a power requirement for uplink control signal transmission between the first device and the second device. To be specific, this can satisfy a transmission range of the uplink control signal.

It should be understood that, in this application, a method for determining the first quantity of symbols is described only by using an example in which the first device determines the first quantity of symbols based on the first reference signal. However, this application is not limited thereto. Alternatively, the first quantity of symbols may be determined by using another method.

Optionally, in this application, the first device receives first information sent by the second device, where the first information is used to indicate a mapping relationship between the first measurement result and the first quantity of symbols; and the first device determines the first quantity of symbols based on the mapping relationship and the first measurement result.

Specifically, in this application, the first device receives the first information sent by the second device, where the first information is used to indicate a mapping relationship between a plurality of measurement results including the first measurement result and a plurality of quantities of symbols including the first quantity of symbols. The first information may be a mapping relationship table indicating the mapping relationship between the plurality of measurement results and the plurality of quantities of symbols, or a mapping relationship formula $x=f(y)$, where x is a quantity of symbols and y is a measurement result. The measurement result y is substituted into the formula x=f(y), to obtain the first quantity of symbols through calculation. For example, when y is equal to $I_2$, the first quantity of symbols x=4 is obtained through calculation by using the formula. The mapping relationship table is shown in Table 1. The first device searches, based on the mapping relationship table and by searching the table, the mapping relationship table for a quantity of symbols that is corresponding to the first measurement result, and uses the quantity of symbols that is corresponding to the first measurement result, as the first quantity of symbols. For example, when a value of the first measurement result is $I_3$ in the table, a quantity of symbols, 7, in the table is determined as the first quantity of symbols.

TABLE 1

| Measurement result | Quantity of symbols |
|---|---|
| $I_1$ | 1 |
| $I_2$ | 4 |
| $I_3$ | 7 |
| $I_4$ | 14 |

It should be understood that, in this application, a correspondence between values of a measurement result and a quantity of symbols in Table 1 is merely used as an example for description. A correspondence between specific values is not limited to the values listed in Table 1.

It should be further understood that, in this application, the mapping relationship table or the mapping relationship formula is merely used as an example for describing the mapping relationship between the plurality of measurement results and the plurality of quantities of symbols. However, this application is not limited thereto. Alternatively, the mapping relationship between the plurality of measurement results and the plurality of quantities of symbols may be described in another manner.

Optionally, the first device receives third information sent by the second device, where the third information is used to indicate the first quantity of symbols; and the first device determines the first quantity of symbols based on the third information.

Specifically, in this application, the first device may send a second reference signal to the second device, so that the second device measures the quality of the channel between the first device and the second device based on the second reference signal, to determine a second measurement result, and determines the first quantity of symbols based on the second measurement result. The second reference signal includes at least one of a sounding reference signal (Sounding Reference Signal, "SRS" for short) and a demodulation reference signal (Demodulation Reference Signal, "DMRS" for short). The second device measures the channel quality of the channel between the first device and the second device based on the second reference signal, to determine the second measurement result. The second device may alternatively measure UE location information, to determine the second measurement result. The second measurement result may be at least one of receive power (Reference Signal Receiving Power, "RSRP" for short), receive quality (Reference Signal Receiving Quality, "RSRQ" for short), or receive strength (Received Signal Strength Indicator, "RSSI" for short). The second device determines the first quantity of symbols based on the second measurement result. The first device receives the third information sent by the second device, where the third information is used to indicate the first quantity of symbols to the first device; and the first device determines the first quantity of symbols based on the third information. The third information may be sent by the second device to the first device by using at least one of downlink control information (Downlink Control Information, "DCI" for short), radio resource control (Radio Resource Control, "RRC" for short) signaling, and broadcast information.

It should be understood that, in this application, that the second device sends the third information to the first device by using the downlink control information DCI, the RRC configuration signaling, or the broadcast information is merely used as an example. However, this application is not limited thereto. Alternatively, the second device may send the third control information to the first device by using other information.

Optionally, content included in the third information is information about a resource for sending an uplink control signal by the first device. For example, the resource may be one or more subframes or one or more timeslots. A quantity of uplink transmission symbols included in the resource is the first quantity of symbols.

220: The first device sends an uplink control signal on at least one resource based on the first quantity of symbols, where a quantity of symbols included in the uplink control signal is a second quantity of symbols, and the second quantity of symbols is greater than or equal to the first quantity of symbols.

Specifically, that the first device sends an uplink control signal to the second device on at least one resource based on the determined first quantity of symbols means that the first device may send the uplink control signal on only one resource or may send the uplink control signal on a plurality of resources. The quantity of symbols included in the uplink control signal is the second quantity of symbols, and the second quantity of symbols is greater than or equal to the first quantity of symbols. Sending the uplink control signal on a plurality of resources is to ensure that, when a quantity of symbols included in a resource is less than the first quantity of symbols, an uplink control signal power requirement of a transmission channel between the second device and the first device is satisfied by transmitting the uplink control signal on a plurality of resources.

Optionally, the first device determines a first time domain resource, and sends the uplink control signal in some or all of uplink transmission symbols that are located in the first time domain resource and after the first time domain resource.

Specifically, that the first device determines a first time domain resource means that the first device determines a start subframe or timeslot for sending the uplink control signal; and starting from the start subframe or timeslot, the first device sends the uplink control signal in some or all of the uplink transmission symbols that are located in the first time domain resource and after the first time domain resource.

For example, the first device may start sending the uplink control signal from an $(n+k)^{th}$ subframe or timeslot, where n is a number of a subframe or timeslot for sending downlink data by the second device to the first device, and k is a nonnegative integer. The first device receives, in an $n^{th}$ subframe or timeslot, the downlink data sent by the second device. When k is equal to 0, the first time domain resource for sending the uplink control signal is the $n^{th}$ subframe or timeslot for receiving the downlink data by the first device. Starting from the $n^{th}$ subframe or timeslot, the first device sends, in some or all of symbols that are in the $n^{th}$ subframe or timeslot and a subframe or timeslot after the $n^{th}$ subframe or timeslot and in which uplink control signal transmission is allowed, the uplink control signal corresponding to the downlink data received by the first device, until sending of the uplink control signal is completed. When k is greater than 0, the first time domain resource for sending the uplink control signal is a subframe or timeslot after the subframe or timeslot for receiving the downlink data by the first device. Starting from the $(n+k)^{th}$ subframe or timeslot, the first device sends, in some or all of symbols that are in the $(n+k)^{th}$ subframe or timeslot and a subsequent subframe or timeslot and in which uplink control signal transmission is allowed, the uplink control signal corresponding to the downlink data received by the first device, until sending of the uplink control signal is completed. To be specific, the first device may send, starting from the $(n+k)^{th}$ subframe or timeslot, in all of the symbols that are in the $(n+k)^{th}$ subframe or timeslot and the subsequent subframe or timeslot and in which uplink control signal transmission is allowed, the uplink control signal corresponding to the downlink data received by the first device; or may send, starting from the $(n+k)^{th}$ subframe or timeslot, in only some of the symbols that are in the $(n+k)^{th}$ subframe or timeslot and the subsequent subframe or timeslot and in which uplink control signal transmission is allowed, the uplink control signal corresponding to the downlink data received by the first device. This is not limited in this application.

It should be understood that, when the first device sends the uplink control signal on the first time domain resource and a resource after the first time domain resource, one or more time domain resources may be occupied for sending the uplink control signal. The plurality of time domain resources may be consecutive time domain resources, or may be nonconsecutive time domain resources. This is not limited in this application.

Optionally, the first device sends the uplink control signal on at least one of time domain resources that are at the first time domain resource and after the first time domain resource.

Specifically, that the first device determines a first time domain resource means that the first device determines a start subframe or timeslot for sending the uplink control signal; and starting from the start subframe or timeslot, the first device sends the uplink control signal on the at least one of the time domain resources that are at the first time domain resource and after the first time domain resource.

For example, the first device may start sending the uplink control signal from an $(n+k)^{th}$ subframe or timeslot, and complete sending the uplink control signal in one subframe or timeslot, where n is a number of a subframe or timeslot for sending downlink data by the second device to the first device, and k is a nonnegative integer. The first device receives, in an $n^{th}$ subframe or timeslot, the downlink data sent by the second device. When k is equal to 0, the first device completes sending the uplink control signal in the $n^{th}$ subframe or timeslot for receiving the downlink data or in one subframe or timeslot after the $n^{th}$ subframe or timeslot. When k is greater than 0, the first device completes sending the uplink control signal in the $(n+k)^{th}$ subframe or timeslot or one subframe or timeslot after the $(n+k)^{th}$ subframe or timeslot.

Optionally, the first device receives fourth information sent by the second device, where the fourth information is used to indicate a location of the first time domain resource.

Specifically, the first device receives the fourth information sent by the second device, where the fourth information is used to indicate, to the first device, the location of the first time domain resource for sending the uplink control signal; and the first device determines, based on the fourth information, the location of the first time domain resource for sending the uplink control signal. For example, the fourth information includes a subframe or timeslot number of the first time domain resource for sending the uplink control signal by the first device. The first device determines, based on the fourth information, to start sending the uplink control signal from an $(n+k)^{th}$ subframe or timeslot.

Optionally, the second device may send the fourth information to the first device in at least one of the following manners: downlink control signaling, RRC signaling, broadcast signaling, or preconfiguration.

It should be understood that, in this application, the foregoing several sending manners are merely used as examples for describing a sending manner of the fourth information. However, this application is not limited thereto.

It should be further understood that, in this application, that the fourth information is used to indicate the location of the first time domain resource is merely used as an example for describing a function of the fourth information. However, this application is not limited thereto.

Optionally, the first device determines M time domain resources, where M≥1.

The first device sends the uplink control signal in some or all of symbols included in the M time domain resources.

Figure 4:
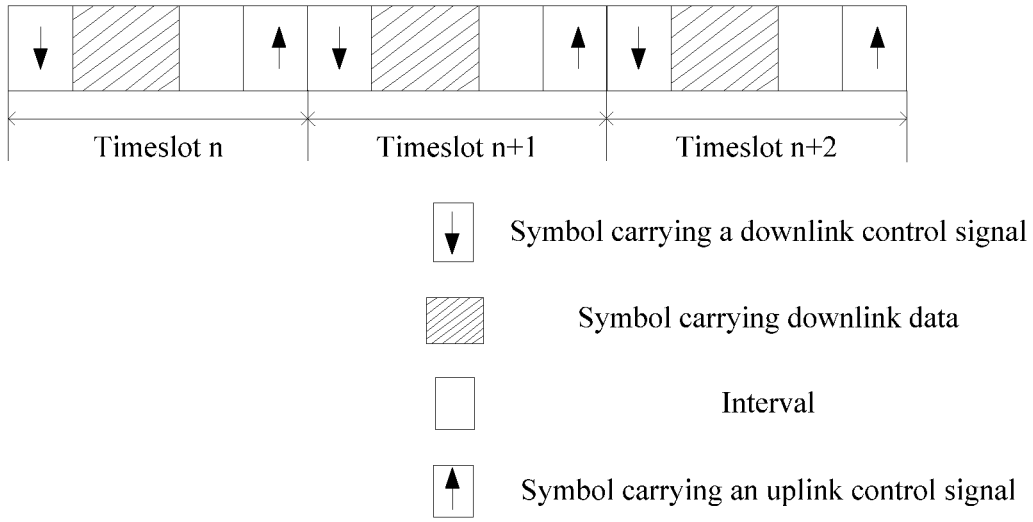
FIG. 4 is a schematic diagram of uplink control signal transmission for which M time domain resources are occupied according to this application.

For example, the first device may start sending the uplink control signal from an $(n+k)^{th}$ subframe or timeslot, and complete sending the uplink control signal at an end of an $(n+m)^{th}$ subframe or timeslot. Some or all of the symbols in the M time domain resources are occupied for sending the uplink control signal, where n is a number of a subframe or timeslot for receiving, by the first device, downlink data sent by the second device, k is a nonnegative integer, and m is a positive integer. The first device starts receiving the downlink data in an $n^{th}$ subframe or timeslot. When k is equal to 0, as shown in FIG. 4, the first device starts sending the uplink control signal in the $n^{th}$ subframe or timeslot, and completes sending the uplink control signal at an end of the $(n+m)^{th}$ subframe or timeslot. In this case, the first device occupies a total of M (M=m+1) subframes or timeslots to complete sending the uplink control signal. When m is equal to 2, it indicates that the first device occupies a total of three subframes or timeslots to complete sending the uplink control signal. When k is greater than 0, the first device starts sending the uplink control signal in the $(n+k)^{th}$ subframe or timeslot, and completes sending the uplink control signal at an end of the $(n+m)^{th}$ subframe or timeslot. In this case, the first device occupies a total of M (M=m+1−k) subframes or timeslots to complete sending the uplink control signal.

Optionally, when M is greater than 1, the first device sends the uplink control signal on at least one of the M time domain resources.

Specifically, when M is greater than 1, it indicates that there is more than one available resource for sending the uplink control signal, and the first device may send the uplink control signal on the plurality of time domain resources, or may send the uplink control signal on only one of the plurality of time domain resources.

It should be understood that the M time domain resources may be consecutive time domain resources, or may be nonconsecutive time domain resources. This is not limited in this application.

Optionally, the first device determines a transmission unit for transmitting the uplink control signal, and transmits the uplink control signal in the uplink control signal transmission unit.

Figure 5:
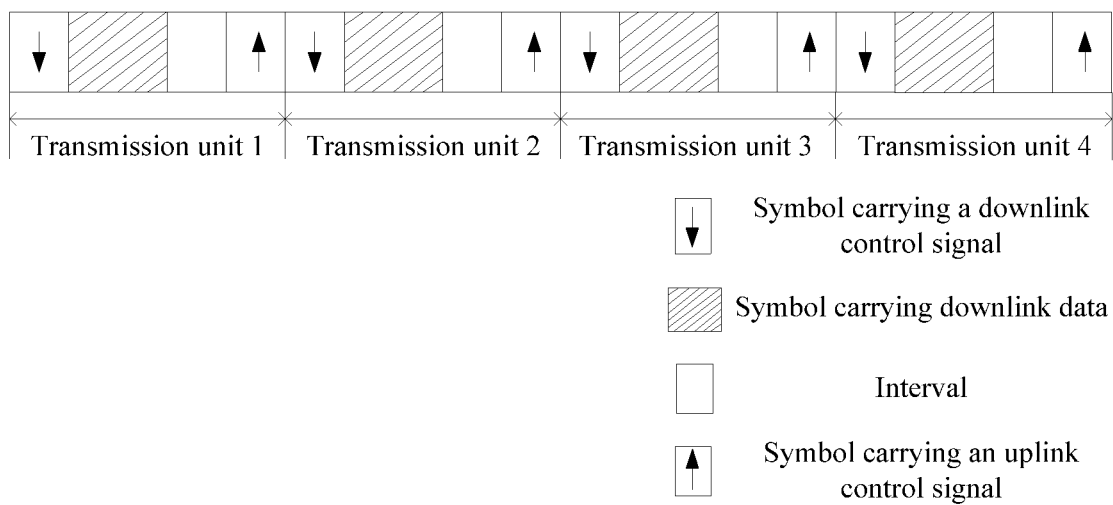
FIG. 5 is a schematic diagram of an example of a type of an uplink control signal transmission unit according to this application.
Figure 6:
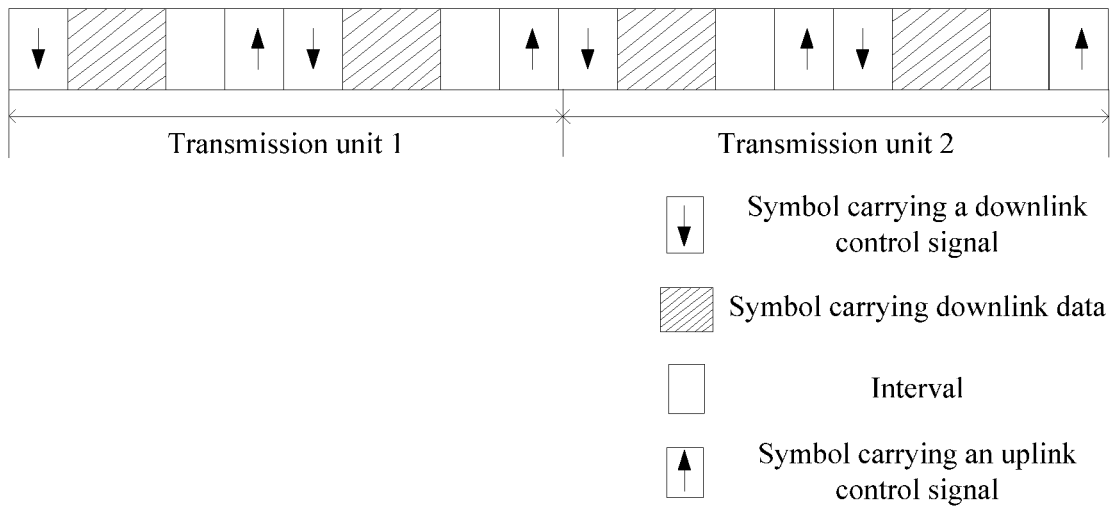
FIG. 6 is a schematic diagram of another example of a type of an uplink control signal transmission unit according to this application.
Figure 7:
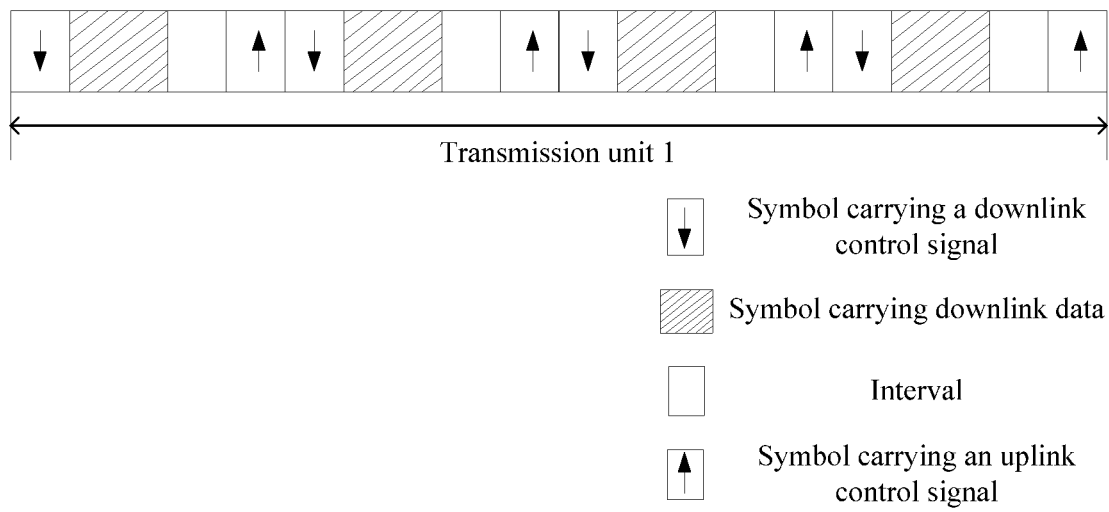
FIG. 7 is a schematic diagram of still another example of a type of an uplink control signal transmission unit according to this application.

For example, one uplink control signal transmission unit includes M subframes or timeslots, and M≥1. The first device completes sending the uplink control signal in one uplink control signal transmission unit. As shown in FIG. 5, one uplink control signal transmission unit includes one timeslot, and each of a timeslot 1, a timeslot 2, a timeslot 3, and a timeslot 4 is an uplink control signal transmission unit. In this case, the first device completes sending the uplink control signal in all or some of uplink transmission symbols in one uplink control signal transmission unit. As shown in FIG. 6, one uplink control signal transmission unit includes two timeslots; a timeslot 1 and a timeslot 2 are used as a first uplink control signal transmission unit, and a timeslot 3 and a timeslot 4 are used as a second uplink control signal transmission unit. In this case, the first device completes sending the uplink control signal in all or some of uplink transmission symbols in the determined first uplink control signal transmission unit or second uplink control signal transmission unit. As shown in FIG. 7, one uplink control signal transmission unit includes four timeslots, and a timeslot 1, a timeslot 2, a timeslot 3, and a timeslot 4 together constitute one uplink control signal transmission unit. In this case, the first device completes sending the uplink control signal in all or some of uplink transmission symbols in the determined one uplink control signal transmission unit.

It should be understood that, in this application, the foregoing several types of uplink control signal transmission units are merely used as examples for describing a type of the uplink control signal transmission unit. However, this application is not limited thereto. The uplink control signal transmission unit may alternatively have another type.

It should be further understood that, in this application, consecutive timeslots are merely used as an example for describing the type of the uplink control signal transmission unit. However, this application is not limited thereto. The uplink control signal transmission unit may alternatively include nonconsecutive subframes or timeslots.

It should be further understood that a type of a subframe or timeslot included in the uplink control signal transmission unit is not limited in this application. The subframe or timeslot included in the uplink control signal transmission unit may be a mainly-used-for-downlink subframe or timeslot, may be a mainly-used-for-uplink subframe or timeslot, or may be an uplink subframe or timeslot.

Optionally, the first device receives fifth information sent by the second device, where the fifth information is used to indicate at least one of the M time domain resources.

Specifically, the first device receives the fifth information sent by the second device, where the fifth information is used to indicate at least one of the M time domain resources. For example, the fifth information may indicate one of the M time domain resources, and the first device determines, based on the fifth information, a location of a start time domain resource for sending the uplink control signal, and sends, starting from the start time domain resource, the uplink control signal on M time domain resources after the start time domain resource. For another example, the fifth information may indicate each or some of the M time domain resources. For example, the fifth information may indicate a number of a subframe or a timeslot in each or some of the M time domain resources, and the first device sends the uplink control signal on all or some of the M time domain resources based on the fifth information.

Optionally, the second device may send the fifth information to the first device in at least one of the following manners: downlink control signaling, RRC signaling, broadcast signaling, or preconfiguration.

Optionally, in this application, a location of the first time domain resource for sending the uplink control signal by the first device and the location of the first time domain resource for receiving the uplink control signal by the second device may be preconfigured by a system. In addition, a location of the M time domain resources occupied for sending the uplink control signal by the first device and the location of the M time domain resources occupied for receiving the uplink control signal by the second device may also be preconfigured by the system. Before the first device sends the uplink control signal, a start location of a time domain resource for uplink control signal transmission between the first device and the second device or the location of the M time domain resources occupied by the uplink control signal is already preconfigured by the system, and the start location of the time domain resource for uplink control signal transmission does not need to be indicated to the peer end. For example, the location of the first time domain resource preconfigured by the system is an $(n+k)^{th}$ subframe or timeslot. In this case, the first device starts sending the uplink control signal from the $(n+k)^{th}$ subframe or timeslot, and the second device starts receiving the uplink control signal from the $(n+k)^{th}$ subframe or timeslot. For another example, the M time domain resources preconfigured by the system are M (M=m−k) subframes or timeslots between the $(n+k)^{th}$ subframe or timeslot and an $(n+m)^{th}$ subframe or timeslot. In this case, the first device sends the uplink control signal in a subframe or timeslot between the $(n+k)^{th}$ subframe or timeslot and the $(n+m)^{th}$ subframe or timeslot, and the second device receives the uplink control signal in the subframe or timeslot between the $(n+k)^{th}$ subframe or timeslot and the $(n+m)^{th}$ subframe or timeslot.

Optionally, the first device sends second information to the second device before sending the uplink control signal, where the second information is used to indicate the quantity of symbols included in the uplink control signal.

Specifically, the first device first sends the second information to the second device before sending the uplink control signal to the second device, where the second information is used to indicate, to the second device, the quantity of symbols included in the to-be-sent uplink control signal, that is, the second quantity of symbols. The second device determines, based on the second information, the quantity of symbols included in the uplink control signal to be sent by the first device, so that the second device receives, more purposefully, the uplink control signal sent by the first device. This improves accuracy and reliability of receiving the uplink control signal by the second device.

It should be understood that, in this application, the foregoing case in which the first device indicates, to the second device, the quantity of symbols included in the to-be-sent uplink control signal is merely an example. The quantity of symbols included in the to-be-sent uplink control signal may alternatively be indicated in another manner. For example, the second device itself determines the quantity of symbols included in the to-be-sent control signal, and then indicates the quantity of symbols to the first device in a specific manner; or the quantity of symbols may be indicated according to a system stipulation, provided that both the first device and the second device learn about the quantity of symbols. This is not limited in this application.

Optionally, when sending the uplink control signal, the first device may repeatedly send an uplink control signal in a plurality of symbols in a subframe or timeslot, where the uplink control signal is repeatedly sent once in each symbol or a plurality of symbols. Alternatively, the first device may send an uplink control signal after performing joint coding in a plurality of occupied symbols.

Optionally, the first device may send the uplink control signal by occupying different frequency resources corresponding to different symbols.

Figure 8:
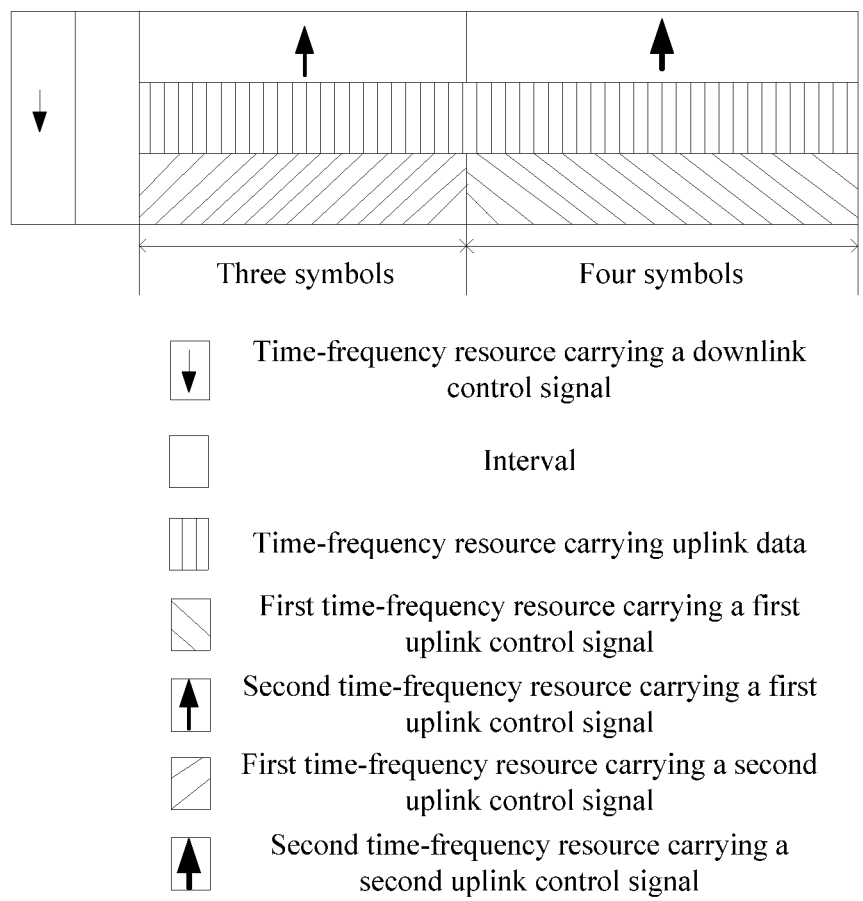
FIG. 8 is a schematic diagram of uplink control signal transmission for which different symbols and different frequency domain resources are occupied according to this application.

Specifically, the first device may send the uplink control signal by occupying different frequency resources corresponding to different symbols, to obtain a greater frequency diversity gain. For example, as shown in FIG. 8, the first device sends the uplink control signal by occupying seven symbols on a time domain resource. For three of the seven symbols, a first frequency resource may be occupied for sending the uplink control signal. For the remaining four symbols, a second frequency resource may be occupied for sending the uplink control signal.

It should be understood that, in this application, the foregoing resource allocation method during uplink control signal sending is merely used as an example for describing a method for increasing a frequency diversity gain. However, this application is not limited thereto.

Optionally, the second device indicates, to the first device, a frequency domain resource for sending the uplink control signal.

Specifically, the second device indicates, in an explicit indication manner to the first device, the frequency domain resource for sending the uplink control signal. For example, the second device indicates a start location of a physical resource block (Physical Resource Block, "PRB" for short) and a quantity of occupied PRBs to the first device, so that the first device sends the uplink control signal on a corresponding PRB based on indication information of the second device. The explicit indication manner may be sending an indication in at least one of the following manners: downlink control signaling, RRC signaling, or broadcast signaling, or a location of the corresponding PBR may be preconfigured by the system in a preconfiguration manner. Alternatively, the second device may indicate, in an implicit indication manner to the first device, the frequency domain resource for sending the uplink control signal. The second device obtains, through calculation by using a time-frequency domain resource occupied by corresponding downlink control signaling or downlink data, the frequency domain resource for sending the corresponding uplink control signal. For example, the calculation is performed by using an index of a time domain or frequency domain resource occupied by a downlink control channel, or the calculation is performed by using an index of a time domain or frequency domain resource occupied by the downlink data. During the implicit calculation, a quantity of symbols occupied by the uplink control signal may also be used as a parametric value of a calculation formula. The quantity of symbols may be determined by the first device and then sent to the second device, or may be determined by the second device itself.

It should be understood that, in this application, the two indication manners, explicit indication and implicit indication, are merely used as examples for describing indication sending of the frequency domain resource for sending the uplink control signal. However, this application is not limited thereto.

Optionally, the first device determines a first resource, and the first device sends the uplink control signal on the first resource, where the first resource includes a time domain resource and/or a frequency domain resource.

The first device determines a time domain resource and/or a frequency domain resource for an uplink control channel included in each subframe or timeslot.

Specifically, the first device determines the first resource, where the first resource includes the time domain resource and/or the frequency domain resource used for uplink control signal transmission. The first device may receive downlink control signaling sent by the second device, where the downlink control signaling is used to indicate a time domain resource and/or a frequency domain resource for an uplink control channel included in a current subframe or timeslot. Alternatively, the first device receives broadcast signaling or RRC signaling sent by the second device, where the broadcast signaling or the RRC signaling is used to indicate a time domain resource and/or a frequency domain resource for an uplink control channel included in each subframe or timeslot within a period of time. For example, the broadcast signaling or the RRC signaling may indicate a pattern of a time-frequency domain resource occupied by the uplink control channel. Alternatively, the second device preconfigures a time domain resource and/or a frequency domain resource for an uplink control channel included in each subframe or timeslot. For example, a frequency domain resource preconfigured by the second device for an uplink control channel included in seven symbols or 14 symbols of one subframe occupies one physical resource block PRB on each of two ends of system bandwidth. The first device sends the uplink control signal on a time domain resource and/or a frequency domain resource on which uplink control signal transmission is allowed, and another time domain resource and/or frequency domain resource that are/is not used for uplink control signal transmission may be used for uplink data transmission.

It should be understood that, in this application, the foregoing method for indicating a time domain resource and/or a frequency domain resource for an uplink control channel included in each subframe or timeslot is merely an example, and a time domain resource and/or a frequency domain resource for an uplink control channel included in each subframe or timeslot may alternatively be indicated in another manner. For example, the first device may determine a time domain resource and/or a frequency domain resource for an uplink control channel included in each subframe or timeslot, and then indicate the time domain resource and/or the frequency domain resource to the second device; alternatively, the time domain resource and/or the frequency domain resource may be indicated according to a system stipulation, provided that both the second device and the first device learn about the time domain resource and/or the frequency domain resource. This is not limited in this application.

230: The second device receives, on the at least one resource, the uplink control signal that is sent by the first device based on the first quantity of symbols, where the quantity of symbols included in the uplink control signal is the second quantity of symbols, and the second quantity of symbols is greater than or equal to the first quantity of symbols.

Specifically, the second device may start receiving, from the location of the first time domain resource, the uplink control signal sent by the first device, until receiving of the uplink control signal is completed. Alternatively, the second device may receive, in some or all of uplink transmission symbols in M subframes or timeslots, the uplink control signal sent by the first device. Alternatively, the second device may receive, in an uplink control signal transmission unit, the uplink control signal sent by the first device.

Alternatively, the second device may receive, in one subframe or timeslot, the uplink control signal sent by the first device.

In this application, when the first device sends the uplink control signal to the second device, the quantity of symbols included in the to-be-transmitted uplink control signal is made corresponding to the channel quality of the channel between the first device and the second device. This can ensure that the uplink control signal can satisfy a sending power requirement. In this way, reliability of uplink control signal transmission between the second device and the first device can be ensured on a basis of flexibility determining the quantity of symbols used to transmit the uplink control signal. Further, a waste of communications resources can be avoided, and communication reliability and accuracy can be improved.

Figure 9:
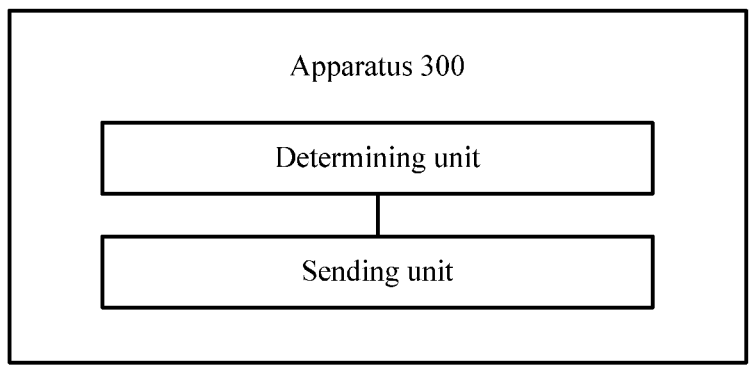
FIG. 9 is a schematic block diagram of an uplink control signal transmission apparatus according to this application.

FIG. 9 is a schematic block diagram of an uplink control signal transmission apparatus 300 according to this application. The uplink control signal transmission apparatus 300 may be corresponding to the first device described in the foregoing system 100 or method 200. In addition, modules or units in the uplink control signal transmission apparatus 300 are configured to perform actions or processing processes performed by the first device in the foregoing system 100 or method 200. Details are omitted herein to avoid repetition.

In this application, the apparatus 300 may include a processor and a transceiver. The processor is connected to the transceiver. Optionally, the device further includes a memory, and the memory is connected to the processor. Further optionally, the device includes a bus system. The processor, the memory, and the transceiver may be connected to each other by using the bus system. The memory may be configured to store an instruction. The processor is configured to execute the instruction stored in the memory, to control the transceiver to send or receive information or a signal.

A determining unit in the apparatus 300 shown in FIG. 9 may be corresponding to the processor, and a sending unit in the apparatus 300 shown in FIG. 9 may be corresponding to the transceiver.

Figure 10:
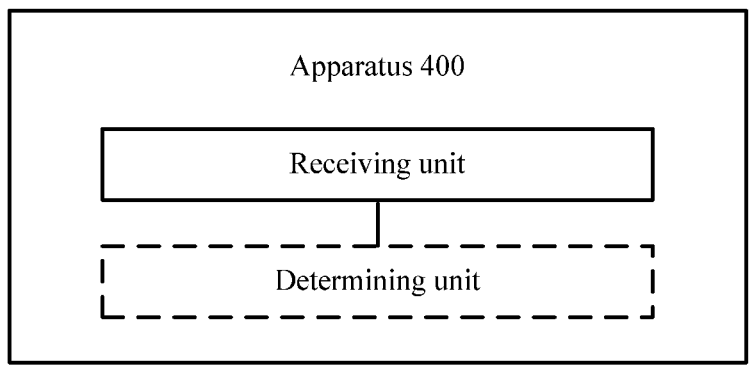
FIG. 10 is a schematic block diagram of an uplink control signal transmission apparatus according to this application.

FIG. 10 is a schematic block diagram of a communications apparatus 400 according to this application. The wireless communications apparatus 400 may be corresponding to the second device described in the foregoing system 100 or method 200. In addition, modules or units in the wireless communications apparatus 400 are configured to perform actions or processing processes performed by the second device in the foregoing system 100 or method 200. Details are omitted herein to avoid repetition.

In this application, the apparatus 400 may include a processor and a transceiver. The processor is connected to the transceiver. Optionally, the device further includes a memory, and the memory is connected to the processor. Further optionally, the device includes a bus system. The processor, the memory, and the transceiver may be connected to each other by using the bus system. The memory may be configured to store an instruction. The processor is configured to execute the instruction stored in the memory, to control the transceiver to send or receive information or a signal.

A receiving unit in the apparatus 400 shown in FIG. 10 may be corresponding to the transceiver, and a determining unit in the apparatus 400 shown in FIG. 10 may be corresponding to the processor.

It should be noted that the foregoing method embodiment of this application may be applied to a processor or implemented by a processor. The processor may be an integrated circuit chip and has a signal processing capability. In an implementation process, the steps in the foregoing method embodiment may be completed by using an integrated logic circuit of hardware in the processor or by using an instruction in a form of software. The processor may be a general purpose processor, a digital signal processor (Digital Signal Processor, "DSP" for short), an application-specific integrated circuit (Application Specific Integrated Circuit, "ASIC" for short), a field programmable gate array (Field Programmable Gate Array, "FPGA" for short) or another programmable logic device, a discrete gate or a transistor logic device, or a discrete hardware component. The processor can implement or perform the method, steps, and logical block diagrams that are disclosed in this application. The general purpose processor may be a microprocessor, or the processor may be any conventional processor or the like. The steps of the method disclosed with reference to this application may be directly performed by a hardware decoding processor, or may be performed by using a combination of hardware in a decoding processor and a software module. The software module may be located in a storage medium that is mature in the art, such as a random access memory, a flash memory, a read-only memory, a programmable read-only memory, an electrically erasable programmable memory, or a register. The storage medium is located in a memory. The processor reads information in the memory, and completes the steps of the foregoing method in combination with the hardware of the processor.

It can be understood that the memory in this application may be a volatile memory or a nonvolatile memory, or may include both a volatile memory and a nonvolatile memory. The nonvolatile memory may be a read-only memory (Read-Only Memory, "ROM" for short), a programmable ROM (Programmable ROM, "PROM" for short), an erasable programmable read only memory (Erasable PROM, "EPROM" for short), an electrically erasable programmable read-only memory (Electrically EPROM, "EEPROM" for short), or a flash memory. The volatile memory may be a random access memory (Random Access Memory, "RAM" for short), and is used as an external cache. As an example rather than a limitation, many forms of RAMs are available, for example, a static random access memory (Static RAM, "SRAM" for short), a dynamic random access memory (Dynamic RAM, "DRAM" for short), a synchronous dynamic random access memory (Synchronous DRAM, "SDRAM" for short), a double data rate synchronous dynamic random access memory (Double Data Rate SDRAM, "DDR SDRAM" for short), an enhanced synchronous dynamic random access memory (Enhanced SDRAM, "ESDRAM" for short), a synchlink DRAM (Synchlink DRAM, "SLDRAM" for short), and a direct memory bus random access memory (Direct Rambus RAM, "DR RAM" for short). It should be noted that the memory in the system and method described in this specification is intended to include but is not limited to these memories and any other appropriate type of memory.

It should be understood that the term "and/or" in this specification is merely an association relationship for describing associated objects, and indicates that three relationships may exist. For example, A and/or B may represent the following three cases: Only A exists, both A and B exist, and only B exists. In addition, the character "/" in this specification usually indicates that there is an "or" relationship between former and latter associated objects.

It should be understood that, in the embodiments of this application, sequence numbers of the foregoing processes do not indicate an execution sequence. An execution sequence of the processes should be determined based on functions and internal logic of the processes, but should not constitute any limitation on implementation processes of this application.

A person of ordinary skill in the art may be aware that units and algorithm steps in examples described with reference to the embodiments disclosed in this specification can be implemented by electronic hardware or a combination of computer software and electronic hardware. Whether the functions are performed by hardware or software depends on specific applications and design constraints of the technical solutions. A person skilled in the art may use different methods to implement the described functions for each specific application, but it should not be considered that such an implementation goes beyond the scope of this application.

It can be clearly understood by a person skilled in the art that, for ease and brevity of description, for detailed working processes of the foregoing systems, apparatuses, and units, reference may be made to corresponding processes in the foregoing method embodiment, and details are not described herein again.

In the several embodiments provided in this application, it should be understood that the disclosed system, apparatuses, and method may be implemented in other manners. For example, the described apparatus embodiments are merely examples. For example, the unit division is merely logical function division and may be other division in actual implementation. For example, a plurality of units or components may be combined or may be integrated into another system, or some features may be ignored or not performed. In addition, the displayed or discussed mutual couplings, direct couplings, or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on an actual requirement, to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software function unit, and are sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a second device, or the like) to perform all or some of the steps of the method described in the embodiments of this application. The foregoing storage medium includes various media that can store program code, such as a USB flash drive, a removable hard disk, a read-only memory (Read-Only Memory, "ROM" for short), a random access memory (Random Access Memory, "RAM" for short), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uplink control signal transmission method implemented by a first device, wherein the uplink control signal transmission method comprises:
    determining a first quantity of symbols; and
    sending an uplink control signal to a second device on at least one resource based on the first quantity of symbols, wherein the uplink control signal comprises a second quantity of symbols, wherein the second quantity of symbols is greater than or equal to the first quantity of symbols, and wherein the uplink control signal is sent by:
        determining M time domain resources, wherein M is greater than or equal to one; and
        sending the uplink control signal in some or all of uplink transmission symbols in the M time domain resources.

2. The uplink control signal transmission method of claim 1, wherein determining the first quantity of symbols comprises:
    receiving first information from the second device, wherein the first information indicates the first quantity of symbols; and
    determining the first quantity of symbols based on the first information.

3. The uplink control signal transmission method of claim 1, wherein the M time resources comprise a first time domain resource, and wherein sending the uplink control signal on the at least one resource comprises sending the uplink control signal in some or all of uplink transmission symbols located in the first time domain resource and after the first time domain resource.

4. The uplink control signal transmission method of claim 3, wherein sending the uplink control signal on the at least one resource comprises sending the uplink control signal on at least one time domain resource that is either at the first time domain resource or after the first time domain resource.

5. The uplink control signal transmission method of claim 3, wherein determining the first time domain resource comprises receiving second information from the second device, and wherein the second information indicates the first time domain resource.

6. The uplink control signal transmission method of claim 1, wherein M is greater than one, and wherein sending the uplink control signal on the M time domain resources comprises sending the uplink control signal on at least one of the M time domain resources.

7. The uplink control signal transmission method of claim 1, wherein determining the M time domain resources comprises receiving third information from the second device, and wherein the third information indicates at least one of the M time domain resources.

8. The uplink control signal transmission method of claim 1, wherein determining the first quantity of symbols comprises determining the first quantity of symbols using a mapping relationship.

9. The uplink control signal transmission method of claim 8, wherein the mapping relationship comprises a correspondence table between measurement results and quantities of symbols.

10. The uplink control signal transmission method of claim 9, wherein the quantities of symbols comprises one, four, seven, and fourteen symbols.

11. The uplink control signal transmission method of claim 8, wherein the mapping relationship comprises a mapping relationship formula.

12. The uplink control signal transmission method of claim 1, wherein the M time domain resources are determined by determining a start subframe or a timeslot.

13. An uplink control signal transmission method implemented by a first device, wherein the uplink control signal transmission method comprises:
sending a first quantity of symbols to a second device; and
receiving, on at least one resource, an uplink control signal from the second device based on the first quantity of symbols, wherein the uplink control signal comprises a second quantity of symbols, wherein the second quantity of symbols is greater than or equal to the first quantity of symbols, and wherein the at least one resource is received by:
determining M time domain resource, wherein M is greater than or equal to one; and
receiving the uplink control signal in some or all of uplink transmission symbols in the M time domain resource.

14. The uplink control signal transmission method of claim 13, wherein before receiving the uplink control signal, the uplink control signal transmission method further comprises sending first information to the second device, and wherein the first information indicates the first quantity of symbols.

15. The uplink control signal transmission method of claim 13, wherein the M time resources comprise a first time domain resource, and wherein receiving the uplink control signal on the at least one resource comprises receiving the uplink control signal in some or all of uplink transmission symbols located in the first time domain resource or after the first time domain resource.

16. The uplink control signal transmission method of claim 15, wherein receiving the uplink control signal on the at least one resource comprises receiving the uplink control signal on at least one time domain resource that is either at the first time domain resource or after the first time domain resource.

17. The uplink control signal transmission method of claim 15, wherein before receiving the uplink control signal, the uplink control signal transmission method further comprises sending second information to the second device, and wherein the second information indicates the first time domain resource.

18. The uplink control signal transmission method of claim 13, wherein M is greater than one, and wherein receiving the uplink control signal on the M time domain resources comprises receiving the uplink control signal on at least one of the M time domain resources.

19. The uplink control signal transmission method of claim 13, wherein before receiving the uplink control signal, the uplink control signal transmission method further comprises sending third information to the second device, and wherein the third information indicates at least one of the M time domain resources.

20. An uplink control signal transmission apparatus, comprising:
a memory configured to store instructions; and
a processor coupled to the memory, wherein the instructions cause the processor to be configured to:
determine a first quantity of symbols; and
send an uplink control signal to a device on at least one resource based on the first quantity of symbols, wherein the uplink control signal comprises a second quantity of symbols, wherein the second quantity of symbols is greater than or equal to the first quantity of symbols, and wherein the uplink control signal is sent by:
determining M time domain resources, wherein M is greater than or equal to one; and
sending the uplink control signal in some or all of uplink transmission symbols in the M time domain resources.

21. The uplink control signal transmission apparatus of claim 20, wherein the instructions further cause the processor to be configured to:
receive first information from the device, wherein the first information indicates the first quantity of symbols; and
determine the first quantity of symbols based on the first information.

22. The uplink control signal transmission apparatus of claim 20, wherein the M time resources comprise a first time domain resource, and wherein the instructions further cause the processor to be configured to send the uplink control signal in some or all of uplink transmission symbols located in the first time domain resource or after the first time domain resource.

23. The uplink control signal transmission apparatus of claim 22, wherein the instructions further cause the processor to be configured to send the uplink control signal on at least one time domain resource that is either at the first time domain resource or after the first time domain resource.

24. The uplink control signal transmission apparatus of claim 22, wherein the instructions further cause the processor to be configured to receive second information from the device, and wherein the second information indicates the first time domain resource.

25. The uplink control signal transmission apparatus of claim 20, wherein M is greater than one, and wherein the instructions further cause the processor to be configured to send the uplink control signal on at least one of the M time domain resources.

26. The uplink control signal transmission apparatus of claim 20, wherein the instructions further cause the processor to be configured to receive third information from the device, and wherein the third information indicates at least one of the M time domain resources.

* * * * *

UNITED STATES PATENT AND TRADEMARK OFFICE
CERTIFICATE OF CORRECTION

PATENT NO. : 10,904,867 B2
APPLICATION NO. : 16/347137
DATED : January 26, 2021
INVENTOR(S) : Da Wang, Jian Wang and Yun Liu Page 1 of 1

It is certified that error appears in the above-identified patent and that said Letters Patent is hereby corrected as shown below:

Page 2, References Cited, Other Publications Line 10, should read:
"R1-104216, Motorola, "UCI Multiplexing on PUSCH in UL-MIMO Transmissions," 3GPP TSG RAN1#61b, Dresden, Germany, June 28 - July 2, 2010, 13 pages."

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*